W. H. HORSTMANN.
SHOCK ABSORBER.
APPLICATION FILED MAY 11, 1912.
1,086,917.
Patented Feb. 10, 1914.
2 SHEETS—SHEET 2.
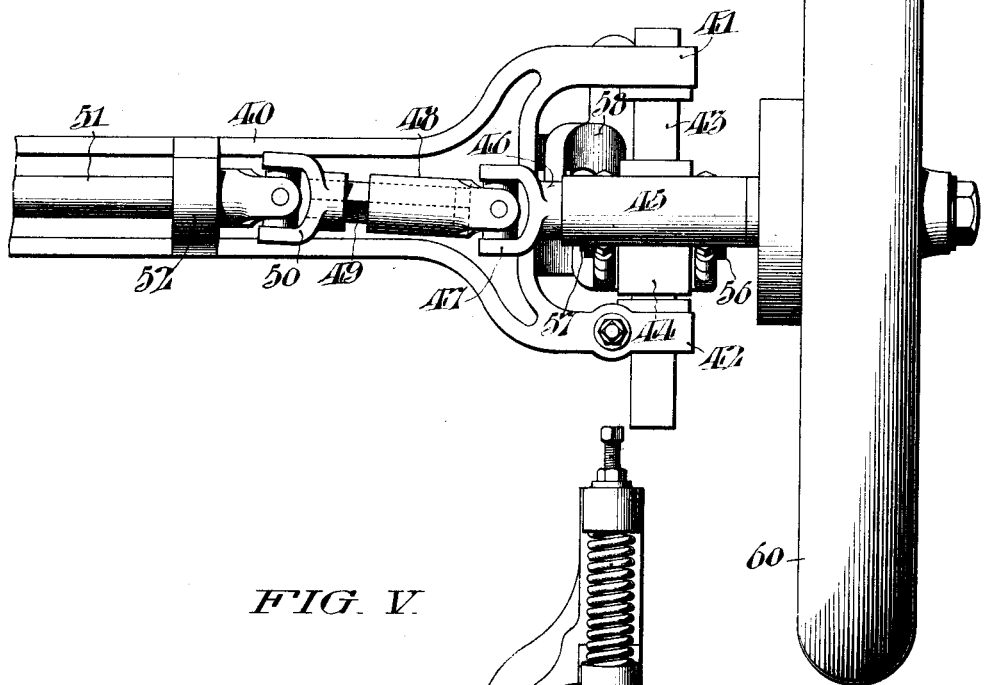
FIG. IV.
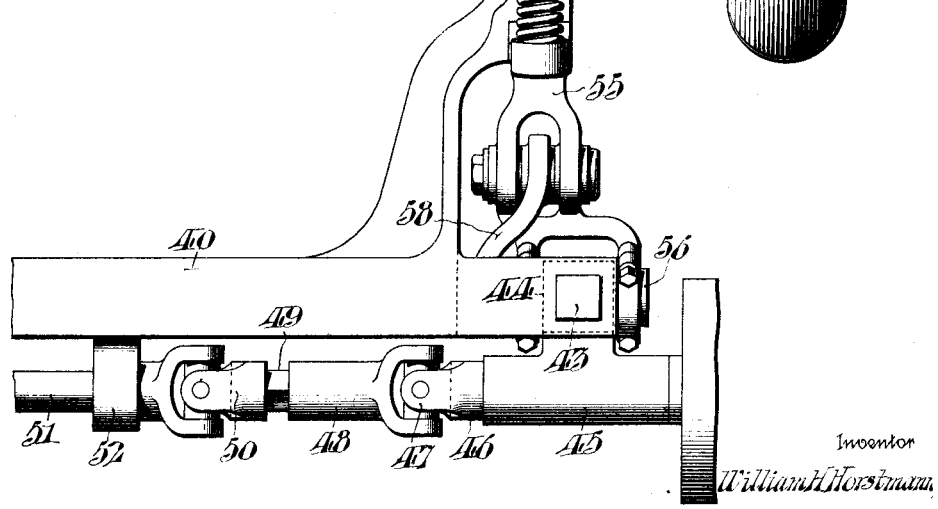
FIG. V.
Inventor
William H. Horstmann
Witnesses
John C. Bergner
James L. Bell
By Maley & Paul
Attorneys

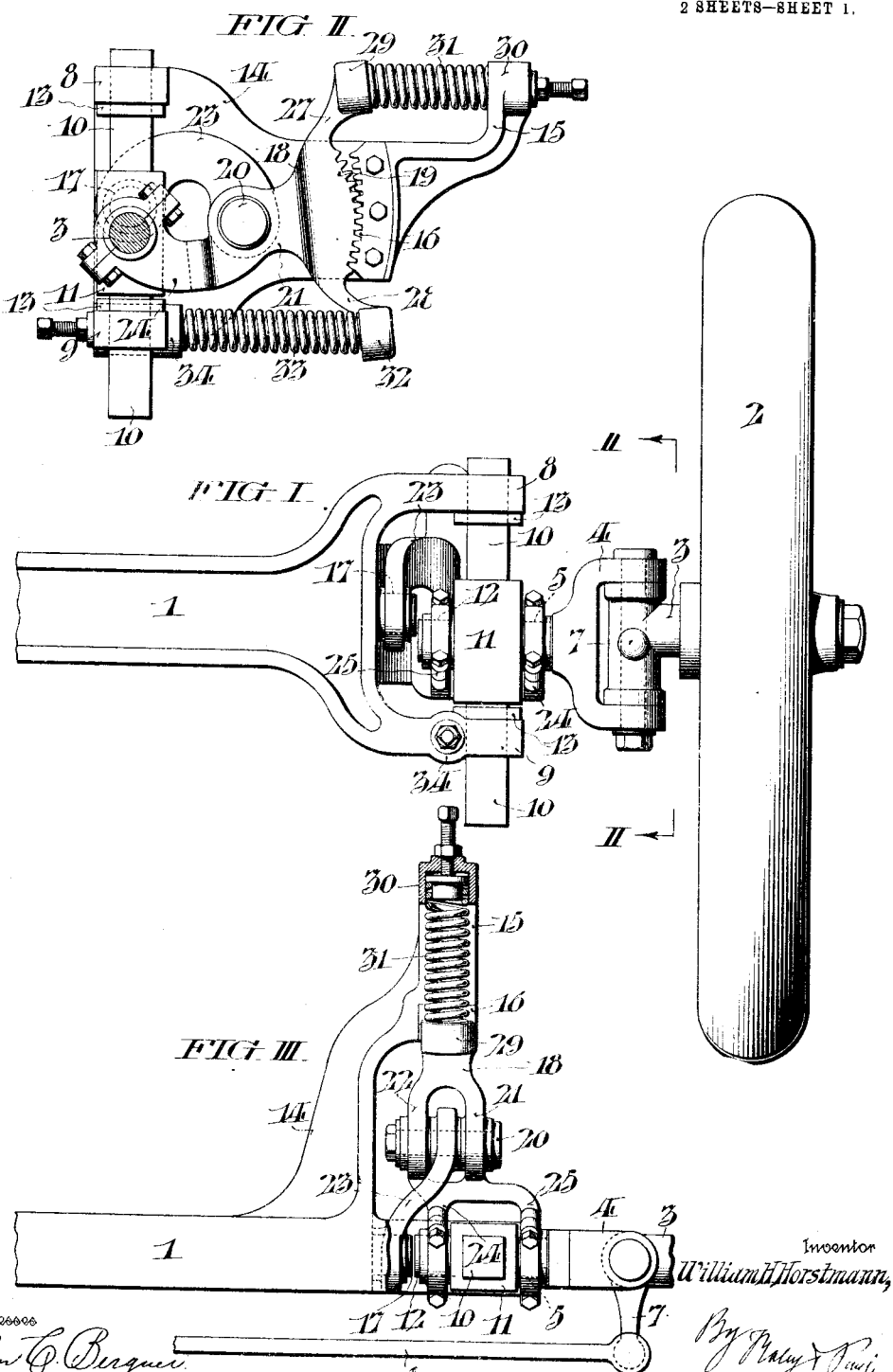

UNITED STATES PATENT OFFICE.

WILLIAM H. HORSTMANN, OF OVERBROOK, PENNSYLVANIA.

SHOCK-ABSORBER.

1,086,917.   Specification of Letters Patent.   Patented Feb. 10, 1914.

Application filed May 11, 1912. Serial No. 696,555.

*To all whom it may concern:*

Be it known that I, WILLIAM H. HORSTMANN, of Overbrook, in the county of Montgomery and State of Pennsylvania, have invented certain new and useful Improvements in Shock-Absorbers, whereof the following is a specification, reference being had to the accompanying drawings.

My invention relates particularly to a shock absorber adapted for use in connection with automobiles and similar vehicles, and its general purpose is to minimize the disturbing effects due to the sudden contact of a wheel, or wheels, with obstacles in the line of travel.

More specifically, among the important results attained by my improvements are the following: The strains, which ordinarily may be said to be manifested by movement of the body of the vehicle in a substantially vertical direction, are divided and converted into resultants manifested in a substantially horizontal direction. In its most complete embodiment this feature of conversion of direction of strain may be independently employed at each of the wheels, so that any one wheel, upon encountering an object which does not affect the others, may individually move vertically with relation to the body of the vehicle, without disturbing the normal relations of the other wheels to said body.

Other objects of my invention, subsidiary to those just mentioned, will be obvious from the full disclosure of the organization.

In the statements just made, and indeed throughout the following specification, I employ the terms "vertical" and "horizontal", as conveniently descriptive of direction, for general purposes, but it must be understood that they are simply typical of desired or indicated planes of movement, and have no restrictive significance.

In the accompanying drawings I have shown two embodiments of my invention, viz.—in connection respectively with a front, or steering, wheel of an automobile, and with a rear, or driven, wheel thereof.

Figure I, is a partial view in elevation of the former embodiment of my invention, showing a front, or steering wheel and a portion of the frame, or chassis to which it is connected through the intervention of my improved shock absorber. Fig. II, is a sectional view thereof, on the line II, II, of Fig. I, looking in the direction of the arrows. Fig. III, is a plan view of the parts constituting the shock absorber, the wheel being omitted, and a portion of the steering mechanism not shown in Fig. I, being indicated. Fig. IV, is a partial view in elevation of the other embodiment of my invention, showing its application to a driven wheel, and Fig. V, is a plan view of the parts shown in Fig. IV, the wheel being omitted.

Referring now to Figs. I, II, and III, the transverse member of the chassis (which may be conveniently termed the front axle-frame), is partly indicated at 1, the wheel at 2, the short stub-axle for the wheel at 3, the spindle or knuckle for the steering mechanism at 4, and the inward prolongation of the stub-axle at 5. The steering rod 6, and its lever 7, (shown in Fig. III) are omitted in Fig. I, to avoid confusion. The shock absorber proper comprises the group of members intermediate between the inner stub-axle 5, and the axle-frame 1. The extremity of said axle-frame 1, is formed with spaced projecting arms 8, and 9, arranged in vertical relation to one another, and having, near their outer ends, guide openings, in which a bar 10, is arranged to slide vertically, through the buffers 13. These openings are preferably rectangular in cross section, as shown in Fig. III, and the bar, though of corresponding cross section, is slightly smaller, so as to permit its free longitudinal movement, but without turning or substantial lateral play. The main stub-axle 5, is rigidly connected to the bar 10, the connection shown in the present instance being by means of a block 11, surrounding and attached to the bar 10, in the side of which block the inner stub-axle 5, is seated and secured. Upon the face of the block which is opposite to that of attachment of the inner stub-axle 5, a projecting stud-bearing 12, is secured, said stud-bearing being coaxial with said stub-axle, and preferably of similar diameter, so as in effect to constitute a prolongation of said stub-axle through the bar 10. In actual practice it may be found convenient to in fact thus extend the extremity of the inner stub-axle, 5, so that it shall protrude through the bar 10, and form the bearing at 12. It will thus be seen that the wheel 2, is so mounted with relation to the axle-frame, 1, as to be capable of free but guided movement with relation thereto in a vertical plane, such vertical movement being a natural resultant of impact of the wheel against an obstacle over which it rides. The bar 10, and the parts just described as carried thereby, are yieldingly supported with relation to the axle-frame 1, in the following manner: A bracket 14, projects horizontally from the axle-frame, said bracket terminating in a vertical extension or bracket arm 15, adapted to constitute an abutment to sustain the strains incident to shock absorption. Said bracket 14, carries a concave internally-toothed segmental rack 16, disposed in vertical relation and having its line of pitch struck from a center which corresponds with the axis of a stud-bearing 17, (shown in dotted lines in Fig. II, and in full lines in Figs. I, and III), said stud-bearing being rigidly mounted upon the end of the axle-frame 1, at a point about intermediate between the arms 8, and 9.

A rolling-lever member 18, having the configuration about to be described, carries at its outer, or front extremity, a geared sector 19, which engages with the concave rack 16, the radius of the pitch-line of the sector gear 19, being just one-half that of the pitch line of the rack 16. Said lever-member, as it extends rearwardly from the sector 19, is bifurcated, or divided by a vertical opening, forming arms 21, and 22; (see Fig. III), in which is mounted a transverse horizontal pin 20, whose axis corresponds with the center of the sector gear 19. This pin may be considered as the fulcrum of the rolling lever 18. A laterally bent link 23, is pivotally connected at one end with said pin 20, at a point intermediate between the arms 20, and 21, and is pivotally mounted at its other end, upon the fixed stud-bearing 17, so that the fulcrum 20, of the rolling lever is capable of a rotative movement of translation about the stud-bearing 17. Said rolling-lever 18, has a further rearwardly extended and laterally off-set portion, which is bifurcated, or divided by a vertical opening, to form another pair of arms 24, and 25, whose ends are provided with capped bearings and pivotally mounted respectively upon the stub-axle extension 5, and the stud-bearing 12, said arms thus embracing the bar 10. The axis of this pivotal support of the arms 24, and 25, lies in the same vertical plane as the axis of the stud-bearing 17, on the end of the axle-frame 1.

The front extremity of the rolling-lever 18, which comprises the geared sector 19, is provided with two peripheral projections, or bracket-arms 27, and 28, respectively. The upper bracket arm 27, terminates in a circular boss, or seat 29, facing a corresponding boss or seat 30, formed upon the upward extremity of the vertically projecting bracket arm 15, at the extremity of the bracket 14. A spring 31, is adjustably secured in sockets in said seats, so as to constitute a compression member between them. The lower bracket arm 28, is provided with a boss or seat 32, facing in the opposite direction from the seat 29, and arranged to carry in its socket, a compression spring 33, whose other extremity is secured in a socket or seat 34, mounted upon the side of the arm 9, of the axle-frame 1. The rolling-lever 18, is, therefore, capable of an epicycloidal movement with relation to the gear 16, of the bracket 14, the nature of said movement being determined by the following factors: The radius of the rack 16, is just twice that of the radius of the sector-gear 19, as before stated; and said radius of the sector-gear is struck from the axis of the pin 20, upon which the rolling-lever 18, is fulcrumed. Said pin 20, (being mounted upon the pivoted link 23), has also a motion of translation in a circular arc about the axis of the stud-bearing 17, upon which the other extremity of the link 23, is pivotally mounted, said axis of said stud-bearing 17, corresponding with the center of the pitch line of the rack 16. The axis of the stub-axle 5, and stud-bearing 12, upon which the rear extremity of the rolling-lever is pivotally mounted, lies in the same vertical plane as the axis of the stud-bearing 17. The resultant of this epicycloidal movement is that when the rolling-lever is actuated to rock upon the sector-rack the axis of the stub-axle, 5, and stud-bearing 12, will move in a plane which passes through the axis of the stud-bearing 17, and since these axes lie in the same vertical plane, the movement will be vertical. Hence the bar 10, which is carried by the rear extremity of the rolling lever, may move freely in its vertical guides, but in so moving will actuate the springs 31, and 33, by reason of the rotative movement of the seats 29, and 32, in opposite directions. As a matter of adjustment, said springs are normally in a condition of compression, owing to the fact that they support the weight of the vehicle body, but when the bar 10, moves upward (as the wheel 2, rides over an obstacle), the springs are further compressed. The vertical strain, which occurs when the wheel 2, rises, is thus changed in direction and divided into horizontal strains, acting in opposite directions to compress the springs 31, and 33.

The organization shown in Figs. IV, and V, where the shock absorber is applied to a driven wheel, is identical with that just described, and hence the detailed description of most of the parts may be omitted. The features of difference relate to the connection between the driven axle and the vertical bar which carries it. Thus, in said figures, 40, represents the stationary rear axle-frame, or transverse bar of the chassis, having the spaced projecting arms 41, and 42, in whose extremities the vertically sliding bar 43, is guided. Said bar carries the block 44, from which the sleeve bearing 45, for the stub-axle 46, of the wheel 60, extends laterally. Said stub-axle is provided with a swiveling yoke 47, engaging with a corresponding swiveling yoke upon the socket piece 48, having an internal cavity of square cross section, in which the correspondingly formed end portion 49, of the swiveling yoke-piece 50, telescopes, so as to permit endwise play. Said yoke-piece is connected with the countershaft 51, which is driven from the motor, and which is supported in bearings, such as 52, rigidly mounted upon the rear axle-frame 40.

The rolling-lever 55, is constructed and mounted similarly to the rolling-lever 18, and its capped ends are pivotally mounted with respect to the block 44, upon the stud-bearings 56, and 57, respectively, the axis of said stud-bearing lying in the same vertical plane with the axis upon which the link 58, is pivotally secured to the axle bar 40. Hence, as the wheel 60, rises in passing over an obstacle, vertical movement of the bar 43, in the guides, is permitted, and the conversion of direction of the strains through the epicycloidal movement of the rolling-lever, takes place as before. The telescoping connection, or some equivalent organization is, of course, necessary in this instance; because the stub-axle for driving the wheel 60, is connected with a countershaft whose bearings are mounted in a fixed relation to the axle-frame 40. Obvious modifications are possible, where other driving connections, as, for instance, a chain drive, are employed.

Having thus described my invention, I desire to again call attention to the fact that I employ the terms "vertical," and "horizontal," as conveniently descriptive of certain general directions of movement, and ordinarily the desired, or selected, direction will be in planes, which have that general relation, when considering the vehicle as traveling upon a level. In thus employing said terms, however, I do not intend to restrict the language of my claims to definite vertical or horizontal directions, and the language must be understood as comprehending the general relations of movement and arrangement of parts. I also employ the term "rolling-lever," as conveniently descriptive of that member of the epicycloidal train which is connected to the support for the wheel and which engages with the rack upon the axle frame, but it will be understood that such term is not restrictive, either as to the form or the mode of operation of said member. I also employ the term "axle-frame," as conveniently descriptive of those members of the chassis which extend transversely at the region of the front and rear wheels, and which carry the body of the vehicle, either directly, or through the intervention of spring mountings, said axle frame being taken as typical of the member which supports the relatively stationary, or fixed geared element of the epicycloidal train.

Having thus described my invention, I claim:

1. A shock absorber for vehicles; comprising a frame member carrying the body of the vehicle; a member carrying the axle of a wheel and capable of guided sliding movement with relation to said frame member; intermediate means connecting said members, said means comprising a member, pivotally connected with said wheel-carrying member, and having a rolling geared engagement with said frame member; and a resilient element arranged between abutments respectively carried by said frame member and said rolling member.

2. A shock absorber for vehicles; comprising a member, carrying the body of the vehicle; a member, carrying the axle of a wheel and capable of guided sliding movement with relation to said body-carrying member; an epicycloidal train intervening between said members, said train comprising a fixed element connected to the body-carrying member, and a rolling member having geared engagement therewith, and pivotally connected with said wheel-carrying member; and a resilient element arranged between an abutment upon said body-carrying member and an abutment carried by a moving member of said train.

3. A shock absorber for vehicles; comprising an axle-frame having vertically disposed guides and a laterally extended bracket; a bar arranged to move vertically in said guides; a wheel-carrying axle connected with said bar; a sector-rack carried by said bracket; a rolling-lever having a sector-gear engaging said rack, and having an extension pivotally engaging with said bar; means for pivotally supporting said lever for rotative movement of translation with relation to said axle-frame; abutments carried by said rolling-lever and said bracket respectively; and a resilient member interposed between said abutments; whereby movement of the bar, in a vertical direction with relation to the axle frame, is attended by actuation of the resilient member in a horizontal direction.

4. A shock absorber for vehicles; comprising an axle-frame having vertically disposed guides and a laterally extended bracket; a bar arranged to move vertically in said guides; a wheel-carrying axle connected with said bar; a sector-rack carried by said bracket; a rolling-lever having a sector-gear engaging said rack, said rolling-lever having a bifurcated extension provided with a transverse pin; a link having one end pivotally attached to said pin and the other end pivotally mounted upon said axle frame; said rolling-lever having a further extended and bifurcated portion pivotally connected with said bar; bracket arms upon said lever, having seats facing in opposite directions; fixed abutments carried by said frame and facing said seats respectively; and springs mounted between said fixed and movable abutments.

5. In a shock absorber for vehicles, the combination of a unitary axle-frame having a vertically disposed guide and a laterally extended bracket at each extremity; a pair of bars arranged to move vertically in said guides respectively; a pair of independent wheel-carrying stub axles, each connected with one of said bars; sector-racks carried by said brackets respectively; rolling-levers having sector-gears respectively engaging said racks and having extensions pivotally engaging with said bars respectively; means for pivotally supporting said levers for rotative movement of translation with relation to said axle-frame; abutments carried by said rolling-levers and said brackets respectively; resilient members interposed between the abutments of the respective rolling-levers and brackets, whereby the movement of the bars in a vertical direction with relation to the axle-frame is attended by actuations of the resilient members in a horizontal direction; a countershaft having bearings mounted in a fixed relation to the axle-frame; means for driving said countershaft; and means whereby each of said independent stub-axles is operatively connected with said countershaft, said means comprising members which have rotative engagement and axial play with relation to said stub-axles respectively.

In testimony whereof, I have hereunto signed my name at Philadelphia, Pennsylvania, this eighth day of May 1912.

WILLIAM H. HORSTMANN.

Witnesses:
 JAMES H. BELL,
 E. L. FULLERTON.

Copies of this patent may be obtained for five cents each, by addressing the "Commissioner of Patents, Washington, D. C."